(12) United States Patent
Yasuda

(10) Patent No.: US 6,507,367 B2
(45) Date of Patent: Jan. 14, 2003

(54) IMAGE PICKUP APPARATUS FOR VARYING FILTER CHARACTERISTICS FOR FOCUS ADJUSTMENT

(75) Inventor: Hitoshi Yasuda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/874,704

(22) Filed: Jun. 13, 1997

(65) Prior Publication Data

US 2002/0075396 A1 Jun. 20, 2002

(30) Foreign Application Priority Data

Jun. 20, 1996 (JP) .............................................. 8-159814

(51) Int. Cl.$^7$ ............................................. H04N 5/232
(52) U.S. Cl. ....................................... 348/355; 348/234
(58) Field of Search ................................. 348/207, 234, 348/335, 342, 345, 349, 353, 354, 355, 360; 396/79, 80, 81, 82; H04N 5/232

(56) References Cited

U.S. PATENT DOCUMENTS 4,967,280 A * 10/1990 Takuma et al. ............. 348/354
5,614,951 A * 3/1997 Lee et al. ................... 348/356
5,694,168 A * 12/1997 Tiji ............................ 348/350
6,037,980 A * 3/2000 Takeda ........................ 348/354

* cited by examiner

Primary Examiner—Tuan Ho
(74) Attorney, Agent, or Firm—Robin, Blecker & Daley (57) ABSTRACT

An image pickup apparatus includes a filter for extracting, from a video signal, a high-frequency component which varies with a state of focusing, and a control part arranged to control a cutoff frequency of the filter according to a luminance level in the video signal.

16 Claims, 5 Drawing Sheets

IMAGE PICKUP APPARATUS FOR VARYING FILTER CHARACTERISTICS FOR FOCUS ADJUSTMENT

BACKGROUND OF THE INVENTION

1. Field of the Invention

This invention relates to an image pickup apparatus having an automatic focusing device and adapted for an interchangeable lens system arranged to permit use of interchangeable lenses.

2. Description of Related Art

Some of video apparatuses such as video cameras have been arranged to use an automatic focusing device operated by a so-called hill climbing method. According to the hill climbing method, a high-frequency component is extracted from a video signal obtained by an image sensor such as a CCD or the like. The focus of a photo-taking lens is adjusted by driving the photo-taking lens in such a way as to cause the extracted high-frequency component to become maximum.

Figure 1:
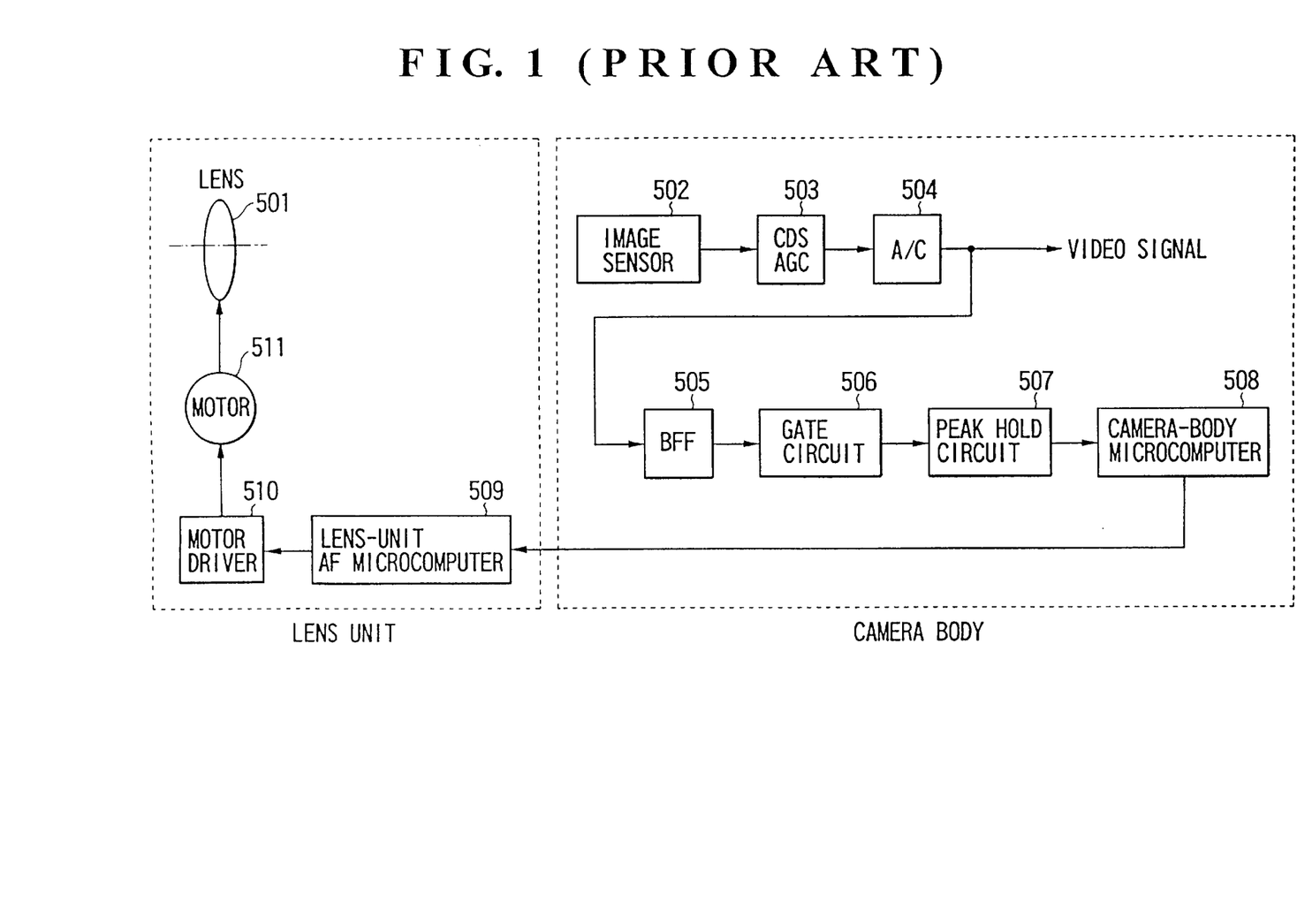
FIG. 1 is a block diagram showing by way of example the arrangement of the conventional video camera.

Such an automatic focusing method permits accurate focus adjustment, irrespective as to whether the object is located at a far distance or at a near distance, without necessitating use of any special optical member for focus adjustment. FIG. 1 shows by way of example a case where such an automatic focusing method is applied to a lens interchangeable type video camera.

Referring to FIG. 1, a focusing lens 501 is used for focusing. A lens driving motor 511 is arranged to move the focusing lens 501 along an optical axis for performing focus adjustment. The light of a picked-up image passing through the focusing lens 501 is imaged on a light receiving plane of an image sensor 502 to be photo-electrically converted into an electrical signal, which is then outputted as a video signal. The video signal thus obtained is supplied to a CDS/AGC (correlated double sampling/automatic gain control) circuit 503. At the CDS/AGC circuit 503, the video signal is sampled and held and, then, amplified up to a predetermined level. After that, the amplified video signal is supplied to an A/D converter 504 to be converted into digital video data. The digital video data is inputted to a camera signal processing circuit (not shown) to be converted into the form of a standard TV signal. The output of the A/D converter 504 is supplied also to a BPF (band-pass filter) 505.

The BPF 505 extracts a high-frequency component of the video signal. The output of the BPF 505 is supplied to a gate circuit 506. The gate circuit 506 is arranged to extract from the high-frequency component only a signal which corresponds to a part set as a focusing-state detecting area within an image plane. The output of the gate circuit 506 is supplied to a peak hold circuit 507 to be peak-held at intervals synchronized with a period which is an integer times as much as the period of a vertical synchronizing signal. An AF (automatic focusing) evaluation value (signal) is formed by the peak holding action. Information on the AF evaluation value is taken in a microcomputer 508 disposed within a camera body and is sent out from the camera-body microcomputer 508 to an AF microcomputer 509 which is disposed within a lens unit.

The AF microcomputer 509 of the lens unit is arranged to decide a focusing speed according to the degree of focusing and a motor driving direction in such a way as to increase the AF evaluation value. The lens unit AF microcomputer 509 then causes a motor driver 510 to drive a motor 511 according to the speed and direction thus decided. The motor 511 then moves the focusing lens 501 along the optical axis to perform focus adjustment accordingly.

In the above-stated conventional image pickup apparatus, the AF microcomputer 509 is disposed on the side of the lens unit. The location of the AF microcomputer 509, however, has presented such a problem that the lens unit AF microcomputer 509 can not change the characteristics of the BPF 505 for performing focus adjustment in such a way as to enable the lens unit AF microcomputer to obtain an optimum AF evaluation value according to the state of the object and the shooting conditions. More specifically, in the case of a focus detecting method whereby information on a focusing state, i.e., a focus signal, is to be extracted from a video signal, the characteristics of the BPF 505 which is disposed on the side of the camera body must be changed according to the current shooting conditions, because the focus signal tends to be affected by changes taking place in the scene and circumstances of the object.

BRIEF SUMMARY OF THE INVENTION

This invention is directed to the solution of the above-stated problem of the prior art. It is, therefore, a first object of the invention to provide an image pickup apparatus having an automatic focusing function by which an in-focus state can be stably attained for a main object of any kind under any shooting conditions.

It is a second object of the invention to arrange an interchangeable lens system to be capable of adequately performing automatic focusing.

To attain the above objects, an image pickup apparatus arranged as a preferred embodiment of the invention comprises a lens unit including a focusing lens, an image sensor arranged to photo-electrically convert a picked-up image light from an object passing through the focusing lens and to output a picked-up image signal, extracting means for extracting a focus signal corresponding to a degree of focusing from a predetermined area within a picked-up image plane obtained from the picked-up image signal, control means for forming a control signal for driving the focusing lens to an in-focus point on the basis of the focus signal extracted, driving means for driving the focusing lens according to the control signal outputted from the control means, and varying means for varying the focus signal to be extracted by the extracting means, wherein the control means and the driving means are disposed at the lens unit, and wherein the varying means is disposed at a body of the image pickup apparatus.

These and other objects and features of the invention will become apparent from the following detailed description of a preferred embodiment thereof taken in connection with the accompanying drawings.

DETAILED DESCRIPTION OF THE INVENTION

Hereinafter, a preferred embodiment of this invention will be described in detail with reference to the drawings.

Figure 2:
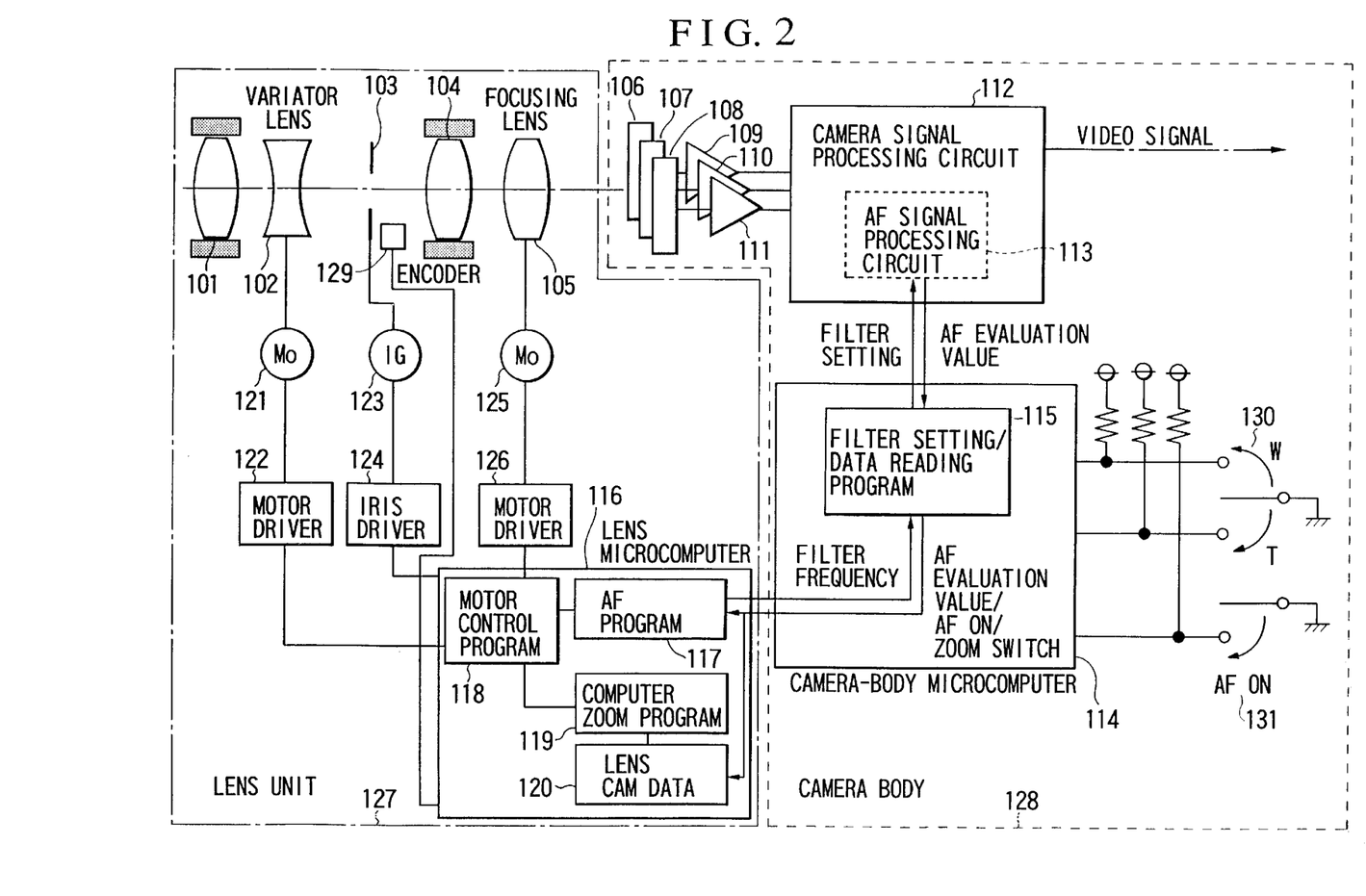
FIG. 2 is a block diagram showing the arrangement of an embodiment of the invention in its entirety.

FIG. 2 shows the arrangement of an embodiment of the invention in its entirety. A picked-up image light from an object passes through a lens system of a lens unit 127 and reaches a camera body 128. The lens system of the lens unit 127 includes a first lens group which is fixed, a second lens group 102 which is arranged to perform a magnification varying action, an iris 103, a third lens group 104 which is fixed, and a fourth lens group 105 which is arranged not only to perform a focus adjusting action but also to compensate for a shift of a focal plane caused by the magnification varying action (hereinafter referred to as the focusing lens). Of the three primary colors components (red, blue and green) of the image light, the red color component is imaged on an image sensor 106 which is a CCD or the like. The green color component is imaged on another image sensor 107 which is a CCD or the like. The blue color component is imaged on a further image sensor 108 which is also a CCD or the like.

The images of the object formed respectively on the image sensors 106, 107 and 108 are photo-electrically converted into electrical signals. These signals are amplified to the respective optimum levels by amplifiers 109, 110 and 111. The amplified signals are inputted to a camera signal processing circuit 112. The camera signal processing circuit 112 converts these inputs into the form of a standard TV signal and outputs it as a video signal. At the same time, the video signal is also supplied to an AF signal processing circuit 113. At the AF signal processing circuit 113, an AF evaluation value (i.e., a focus signal varying with the degree of focusing) is formed from a high-frequency component of the video signal which varies with the state of focus. The AF evaluation value is read out by a filter setting/data reading program 115 arranged within a microcomputer 114 which is disposed on the side of the camera body 128. Then, the AF evaluation value is sent to a lens microcomputer 116. In addition to the AF evaluation value, the camera-body microcomputer 114 reads the states of a zoom switch 130 and an AF switch 131 and sends also information on the states of these switches 130 and 131 to the lens microcomputer 116.

Within the lens microcomputer 116, an AF program 117 receives the information on the state of the AF switch 131 and the AF evaluation value from the camera-body microcomputer 114. When the AF switch 131 is found to be in an on-state, the lens microcomputer 116 causes, on the basis of the AF evaluation value through a motor control program 118, a focus motor driver 126 to drive a focus motor 125 to move the focusing lens 105 along an optical axis for focusing purposes.

The lens unit 127 and the camera body 128 are arranged to be detachable from each other. The lens microcomputer 116 is arranged to decide a frequency to be extracted for obtaining the AF evaluation value according to the conditions of the object and to send information on the extracting frequency thus decided to the camera-body microcomputer 114. Upon receipt of the information, the camera-body microcomputer 114 controls the AF signal processing circuit 113 through the filter setting/data reading program 115 in such a way as to extract the frequency decided.

In other words, the AF signal processing circuit (extracting means) 113 extracts an AF evaluation value (focus signal) indicating the degree of focusing from a predetermined area of the picked-up image plane obtained from the image sensors 106, 107 and 108. To be more specific, the AF signal processing circuit 113 extracts one or a plurality of AF evaluation values consisting of a signal or signals of specific frequency components which are obtained through one or a plurality of filters within the picked-up image plane as will be described later.

The lens microcomputer (control means) 116 decides the direction and the speed at which the focusing lens 105 is to be driven, on the basis of the AF evaluation value extracted. The focus motor (driving means) 125 then moves the focusing lens 105 to an in-focus position on the basis of the output of the lens microcomputer 116.

The camera-body microcomputer (varying means) 114 which is disposed on the side of the camera body (apparatus body) 128 receives the information on the specific extracting frequency decided by the lens microcomputer 116 and then varies the frequency to be extracted by the filter to the specific frequency decided.

Figure 3:
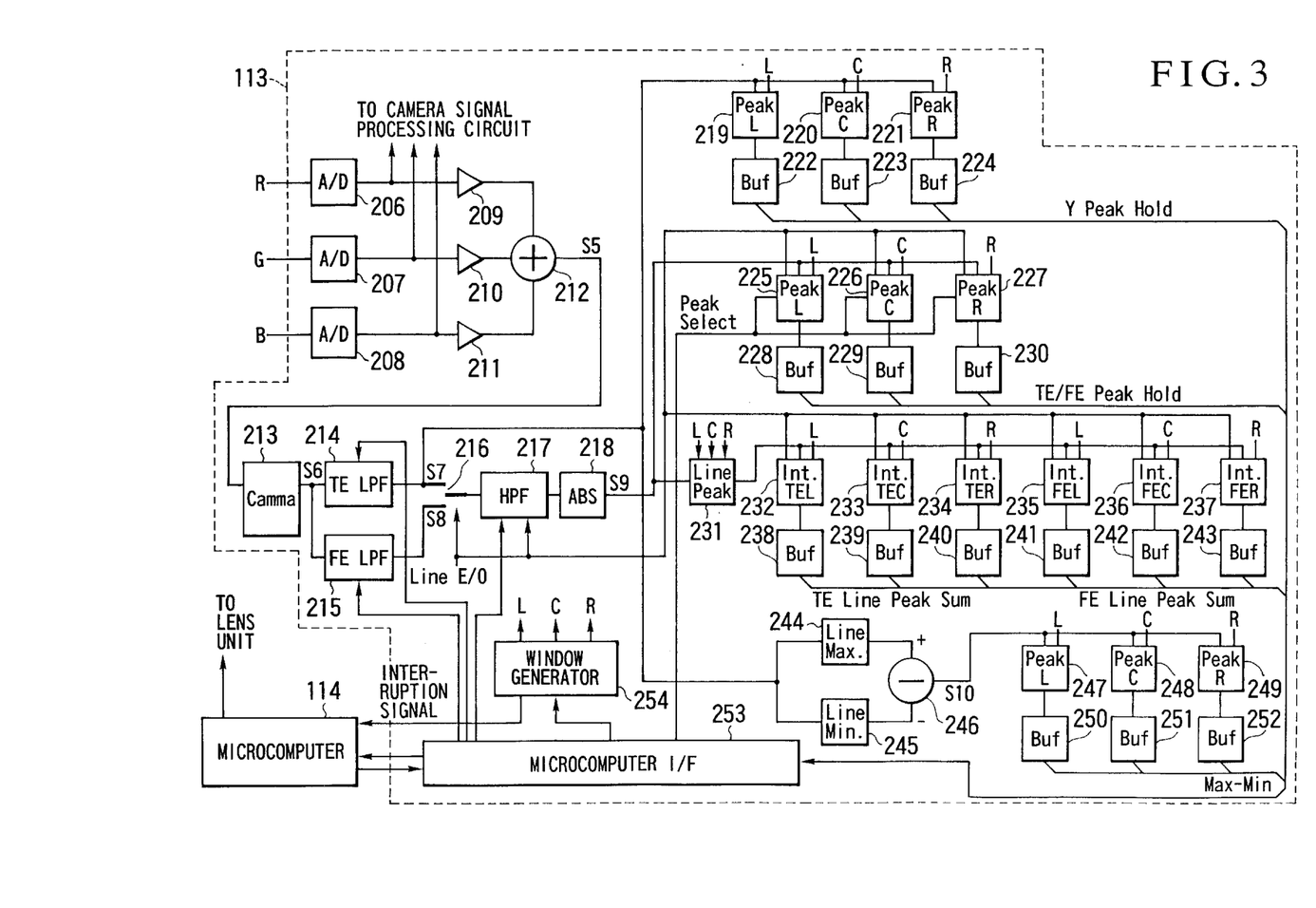
FIG. 3 is a block diagram showing the arrangement of an AF signal processing circuit shown in FIG. 2.

The details of the AF signal processing circuit 113 are next described with reference to FIG. 3. Referring to FIG. 3, the outputs of the CCDs (image sensors) of red (R), green (G) and blue (B) which have been amplified to the respective optimum levels by the amplifiers 109, 110 and 111 are supplied respectively to A/D converters 206, 207 and 208 to be converted into digital signals. While the digital signals are sent to the camera processing circuit 112, they come also to the AF signal processing circuit 113 to be amplified respectively by amplifiers 209, 210 and 211. The amplified signals from the amplifiers 209, 210 and 211 are added up by an adder 212 to form an automatic focusing luminance signal S5.

The luminance signal S5 is supplied to a gamma circuit 213 to be subjected to a gamma conversion process which is carried out according to a predetermined gamma curve, so that a signal S6 in which a low-frequency component thereof is emphasized and a high-frequency component thereof is suppressed is obtained. The gamma-converted signal S6 is supplied to a low-pass filter (TE-LPF) 214 which is of a high cutoff frequency and another low-pass filter (FE-LPF) 215 which is of a low cutoff frequency. Then, according to filter characteristics decided by the camera-body microcomputer 114 based on the information on the extracting frequency received from the lens microcomputer 116 through the microcomputer interface (I/F) 253, low-frequency components are extracted from the signal S6 by the TE-LPF 214 and the FE-LPF 215. As a result, a signal S7 is formed by the TE-LPF 214 and a signal S8 is formed by the FE-LPF 215.

One of the signals S7 and S8 is selected by a switch 216 according to a line E/O signal which is for making a discrimination between an even-number horizontal line and an odd-number horizontal line. After being selected by the switch 216, the signals S7 or S8 is inputted to a high-pass filter (HPF) 217. In other words, the even-number line passes the signal S7 to the HPF 217, and the odd-number line passes the signal S8 to the HPF 217.

The HPF 217 extracts only a high-frequency component according to information on odd-number/even-number filter characteristics sent out by the camera-body microcomputer 114 through the microcomputer interface 253. The output of the HPF 217 is supplied to an absolute value circuit (ABS) 218 to be converted into an absolute value, thereby obtaining a positive signal S9. The signal S9 is supplied to peak hold circuits 225, 226 and 227 and a line peak hold circuit 231.

Figure 4:
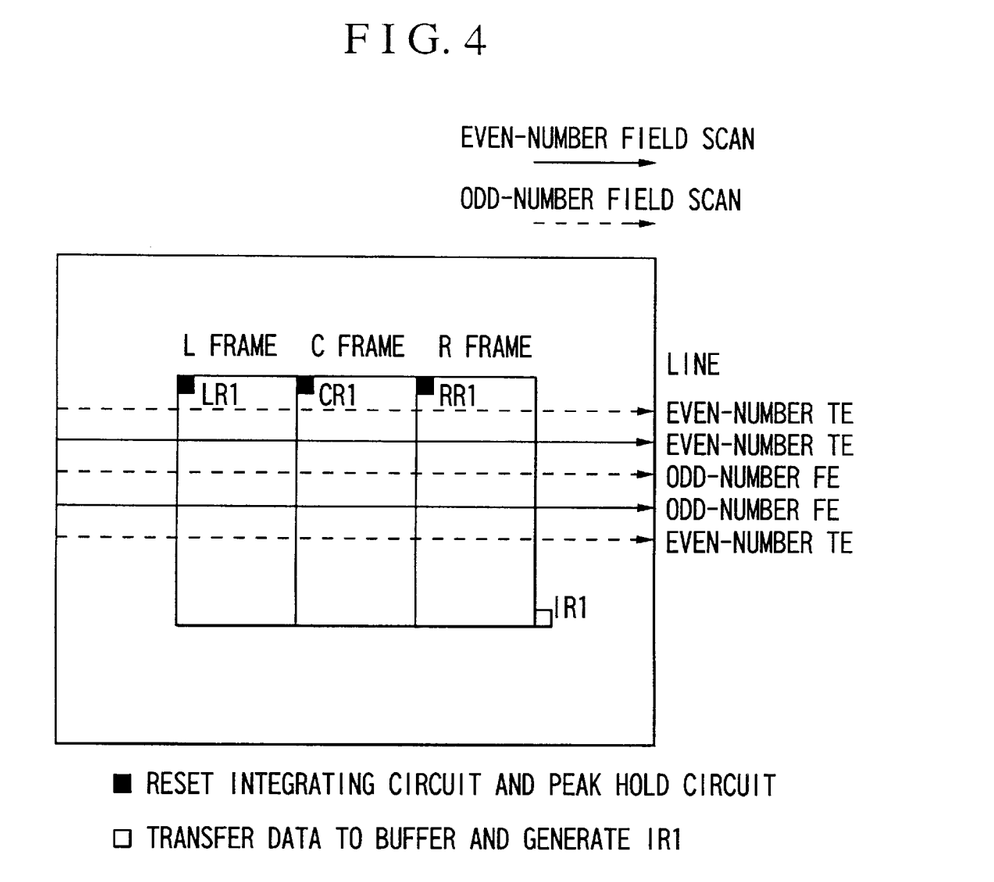
FIG. 4 is a timing chart showing an operation of the AF signal processing circuit shown in FIG. 2.

A window generator circuit 254 is arranged to generate an L frame signal, a C frame signal and an R frame signal as focus adjusting gate signals in positions within an image plane as shown in FIG. 4. The L frame signal outputted from the window generator circuit 254 and the line E/O signal for making a discrimination between even-number-th and odd-number-th horizontal lines are inputted to the peak hold circuit 225. The peak hold circuit 225 is initialized by a reset signal LR1 at an upper left leading part of the focus adjusting L frame as shown in FIG. 4. Then, the signal S9 of either an even-number line or an odd-number line designated by the camera-body microcomputer 114 through the microcomputer interface 253 within each frame is peak-held. The peak-held value thus obtained within the frame is caused by a data transfer signal IR1 to be transferred to a buffer 228 to form a TE-FE peak evaluation value.

The C frame signal from the window generator circuit 254 and the line E/O signal are likewise inputted to the peak hold circuit 226. The peak hold circuit 226 is initialized by a reset signal CR1 at an upper left leading part of the focus adjusting C frame as shown in FIG. 4. Then, the signal S9 of either an even-number line or an odd-number line within each frame, designated by the camera-body microcomputer 114 through the microcomputer interface 253, is peak-held. The peak-held value of the frame thus obtained is caused by the data transfer signal IR1 to be transferred to a buffer 229 to form a TE/FE peak evaluation value.

To the peak hold circuit 227 are inputted the R frame signal of the window generator circuit 254 and the line E/O signal. The peak hold circuit 227 is initialized by a reset signal RR1 at an upper left leading part of the focus adjusting R frame as shown in FIG. 4. Then, the signal S9 of either an even-number line or an odd-number line within the frame, designated by the camera-body microcomputer 114 through the microcomputer interface 253, is peak-held and is then caused by the data transfer signal IR1 to be transferred to a buffer 230 to form a TE/FE peak evaluation value.

To the line peak hold circuit 231 are supplied the signal S9 and the L, C and R frame signals outputted from the window generator circuit 254. The line peak hold circuit 231 is thus initialized at a start point in the horizontal direction within each frame, and a peak value of one line of the signal S9 within each frame is held.

Integrating circuits 232, 233, 234, 235, 236 and 237 are arranged to receive the output of the line peak hold circuit 231 and the line E/O signal which is a signal for making a discrimination between even-number-th and odd-number-th horizontal lines. Further, the L frame signal of the window generator circuit 254 is inputted to the integrating circuits 232 and 235. The C frame signal of the window generator circuit 254 is inputted to the integrating circuits 233 and 236. The R frame signal of the window generator circuit 254 is inputted to the integrating circuits 234 and 237.

The integrating circuit 232 is initialized by the reset signal LR1 at the upper left leading part of the focus adjusting L frame. Then, the integrating circuit 232 adds the output of the line peak hold circuit 231 to its internal register immediately before the end of even-number lines within each frame. A peak-held value thus obtained is caused by the data transfer signal IR1 to be transferred to a buffer 238 to form a line peak integral evaluation value.

The integrating circuit 233 is initialized by the reset signal CR1 at the upper left leading part of the focus adjusting C frame. Then, the integrating circuit 233 adds the output of the line peak hold circuit 231 to its internal register immediately before the end of even-number lines within each frame. A peak-held value thus obtained is caused by the data transfer signal IR1 to be transferred to a buffer 239 to form a line peak integral evaluation value.

The integrating circuit 234 is initialized by the reset signal RR1 at the upper left leading part of the focus adjusting R frame. Then, the integrating circuit 234 adds the output of the line peak hold circuit 231 to its internal register immediately before the end of even-number lines within each frame. A peak-held value thus obtained is caused by the data transfer signal IR1 to be transferred to a buffer 240 to form a line peak integral evaluation value.

While the integrating circuits 232, 233 and 234 are arranged to perform adding operations on the data of even-number lines as mentioned above, other integrating circuits 235, 236 and 237 are arranged to perform adding operations on the data of odd-number lines and to have the results of addition transferred respectively to buffers 241, 242 and 243.

Further, the signal S7 is inputted to peak hold circuits 219, 220 and 221, a line maximum value hold circuit 244 and a line minimum value hold circuit 245.

The L frame signal outputted from the window generator circuit 254 is inputted to the peak hold circuit 219. The peak hold circuit 219 is initialized by the reset signal LR1 at the upper left leading part of the L frame and peak-holds the signal S7 within the frame. The result of peak holding is caused to be transferred to a buffer 222 by the data transfer signal IR1 to form a Y peak evaluation value.

The C frame signal outputted from the window generator circuit 254 is likewise inputted to the peak hold circuit 220. The peak hold circuit 220 is then initialized by the reset signal CR1 at the upper left leading part of the C frame and peak-holds the signal S7 within the frame. The result of peak holding is caused by the data transfer signal IR1 to be transferred to a buffer 223 to form a Y peak evaluation value.

The R frame signal outputted from the window generator circuit 254 is likewise inputted to the peak hold circuit 221. The peak hold circuit 221 is initialized by the reset signal RR1 at the upper left leading part of the R frame and peak-holds the signal S7 within the frame. The result of peak holding is caused by the data transfer signal IR1 to be transferred to a buffer 224 to form a Y peak evaluation value.

The L, C and R frame signals outputted from the window generator circuit 254 are inputted both to the line maximum value hold circuit 244 and the line minimum value hold circuit 245. These circuits 244 and 245 are then initialized at the start point in the horizontal direction of each frame and hold the maximum and minimum values of one line of the signal S7 obtained within each frame. The maximum and minimum values thus held are inputted to a subtracter 246, which then performs a subtracting operation to obtain a (maximum value−minimum value) signal S10. The signal S10 is inputted to peak hold circuits 247, 248 and 249.

The L frame signal outputted from the window generator circuit 254 is inputted to the peak hold circuit 247. The peak hold circuit 247 is initialized by the reset signal LR1 at the upper left leading part of the L frame and peak-holds the signal S10 within the frame. The data transfer signal IR1 causes the result of peak holding to be transferred to a buffer 250 to form a Max−Min evaluation value which represents a difference between the maximum and minimum values of the luminance of the object.

The C frame signal outputted from the window generator circuit 254 is likewise inputted to the peak hold circuit 248. Then, the peak hold circuit 248 is initialized by the reset signal CR1 at the upper left leading part of the C frame and peak-holds the signal S10 within the frame. The data transfer signal IR1 causes the result of peak holding to be transferred to a buffer 251 to form a Max–Min evaluation value.

The R frame signal outputted from the window generator circuit 254 is likewise inputted to the peak hold circuit 249. The peak hold circuit 249 is initialized by the reset signal RR1 at the upper left leading part of the R frame and peak-holds the signal S10 within the frame. The data transfer signal IR1 causes the result of peak holding to be transferred to a buffer 252 to form a Max–Min evaluation value.

At the same time as the transfer of data by the data transfer signal IR1 shown in FIG. 4 to the buffers 222, 223, 224, 228, 229, 230, 238, 239, 240, 241, 242, 243, 250, 251 and 252, the window generator circuit 254 sends an interruption signal to the camera-body microcomputer 114. Upon receipt of the interruption signal, the camera-body microcomputer 114 reads through the microcomputer interface 253 the data from within each of the buffers after completion of a lower frame before the next data is transferred to the buffer. The data thus read out is transferred to the lens microcomputer 116 in synchronism with a vertical synchronizing signal.

FIG. 4 shows the timing of an operation performed within the AF signal processing circuit 113. In FIG. 4, an outside frame represents an effective video image plane of the outputs of the image sensors 106, 107 and 108. Three divided frames located inside of the image plane are focus adjusting gate frames including the L frame which is located on the left side, the C frame which is located in the center, and the R frame which is located on the right side of the image plane. The L frame signal which forms the left side frame L, the C frame signal which forms the center frame C and the R frame signal which forms the right frame R are outputted from the window generator circuit 254.

The reset signals LR1, CR1 and RR1 are formed by outputting reset signals at the start points of the L, C and R frames. The integrating circuits, the peak hold circuits, etc., are reset by these reset signals. Upon completion of these frames, the data transfer signal IR1 is formed for transferring each integral value and each peak-held value to the applicable buffers.

Further, in FIG. 4, scanning of an even-number field is indicated by a full line. Scanning of an odd-number field is indicated by a broken line. In both the even-number field and the odd-number field, the output of the TE-LPF 214 is selected for the even-number lines, while the output of the FE-LPF 215 is selected for the odd-number lines.

As described above, the AF signal processing circuit 113 which is disposed within the camera signal processing circuit 112 is arranged to obtain evaluation values of varied kinds to be used for focus detection from within each of the L, C and R frames, which are distance measuring frames. More specifically, the values obtained from these distance measuring frames L, C and R include:

(1) A peak value of the even-number line high-frequency component: "TE Line Peak Hold",
(2) An integral value of TE line peak values within the distance measuring frame: "TE Line Peak Sum",
(3) A peak value of the odd-number line high-frequency component: "FE Line Peak Hold",
(4) An integral value of FE line peak values within the distance measuring frame: "FE Line Peak Sum",
(5) A peak value of luminance (Y) maximum–minimum values of each line: "Max–Min", and
(6) A peak value of a Y signal: "Y Peak Hold".

The data of these evaluation values are supplied to the camera-body microcomputer 114 through the microcomputer interface 253 and are then transferred to the AF program 117 of the lens microcomputer 116 of the lens unit 127. The lens microcomputer 116 performs actual control over the focusing lens 105 according to the evaluation values transmitted from the camera body 128 and received by the AF program 117.

In this case, the lens unit 127 is of the inner-focus type in which a focal plane changes according to the position of the variator lens and that of the focusing lens. While a zooming action is in process, a focusing locus of the focusing lens determined by the position of the variator lens and that of the focusing lens is selected on the basis of the lens cam data 120. Then, an AF control action on the focusing lens and a control action on tracing the focusing locus selected are carried out in parallel with each other.

The automatic focusing operation of the lens microcomputer 116, using the TE/FE peak evaluation value of each frame, the TE line peak integral evaluation value, the FE line peak integral evaluation value, the Y peak evaluation value and the Max–Min evaluation value, is next described as follows.

The TE/FE peak evaluation value is a peak value of the high-frequency component of each line and indicates a degree of focusing. Since it is a peak hold value, it is dependent on the object to a relatively less degree, not much affected by camera shakes or the like, and is therefore most suited for use in deciding a focusing degree, i.e., in making a check for an in-focus point by finding if the focus signal is at its peak value, and also in deciding a restart of the focusing action after an in-focus state is obtained.

The TE line peak integral evaluation value and the FE line peak integral evaluation value also indicate a degree of focusing. However, they are most suited in deciding the driving direction of the focusing lens, because they are stable having not much noises by virtue of the advantageous effect of integration.

Further, of the TE and FE line peak integral evaluation values, the TE value is most suited for use in the neighborhood of an in-focus state as it is obtained by extracting a higher frequency component. The FE value is, on the other hand, most suited for use at the time of greatly blurred state deviating much from an in-focus state as it is obtained by extracting a relatively low-frequency component. The Y peak evaluation value and the Max–Min evaluation value are dependent on the object but not much on the degree of focusing. Therefore, the use of these values, by carrying out some processes such as normalizing them for removal of any adverse effect of brightness, is most suited for grasping the state of the object in deciding a focusing degree, in deciding a restart of focusing and in deciding the direction of focusing.

More specifically, the Y peak evaluation value is used in making a discrimination between a high luminance object and a low luminance object. The Max–Min evaluation value is used in deciding a degree of contrast. Control can be appositely carried out by predicting the size of hills of the TE/FE peak evaluation value, the TE line peak integral evaluation value and the FE line peak integral evaluation value and by putting in necessary corrections.

These evaluation values are transferred from the camera body 128 to the lens unit 127 to have an automatic focus adjusting action executed by the lens microcomputer 116 within the lens unit 127. The lens microcomputer 116 decides, according to the size of the Y peak evaluation value, the filter characteristic of the TE-LPF 214 which is of a high cutoff frequency and that of the FE-LPF 215 which is of a low cutoff frequency as mentioned in the foregoing. Information on the filter characteristics decided is sent to the camera-body microcomputer 114. The camera-body microcomputer 114 then changes the cutoff frequencies as necessary, so that an AF evaluation value which is most suited to the object can be obtained.

Generally, the video signal of an object of a high luminance includes a higher frequency component than an object having a low luminance. For an object of a high luminance, therefore, the embodiment is arranged to use a higher frequency component as the evaluation value by adjusting the cutoff frequency of the filter to a higher frequency. For an object of a low luminance, a lower frequency component is used as the evaluation value by adjusting the cutoff frequency to a lower frequency. The arrangement enhances the accuracy of automatic focusing (AF), so that the AF action can be reliably carried out.

More specifically, the cutoff frequencies of the low-pass filters (TE-LPF) 214 and (FE-LPF) 215 and the high-pass filter (HPF) 217 which are arranged to have different cutoff frequencies within the AF signal processing circuit 113 included in the camera signal processing circuit 112 are changed according to the Y peak value (a peak value of the level of luminance).

Normally, the high cutoff frequency of the FE-LPF 215 is set at 300 to 500 kHz or thereabout, while the high cutoff frequencies of the TE-LPF 214 and the HPF are set at 1 to 2 MHz. In a case where the Y peak signal indicates a high luminance object having a point reaching a saturation level, the high luminance of the object causes the level of the high-frequency component to rise. In that case, the cutoff frequency of each of the filters is shifted to a higher frequency, so that automatic focusing can be accurately carried out even in the case of a high luminance object.

In the event of a low luminance object, on the other hand, the cutoff frequency of each of the filters is shifted to a lower frequency, so that automatic focusing can be always accurately carried out irrespective of any changes taking place in the luminance of the object.

The control information required in changing the cutoff frequencies of the filters in the above manner is supplied from the lens microcomputer 116 to the camera-body microcomputer 114. Then, the control information is supplied to the filter setting/data reading program 115 set within the camera-body microcomputer 114. The AF signal processing circuit 113 included in the camera signal processing circuit 112 is controlled on the basis of the control information. The cutoff frequency of each filter is changed to change its passband accordingly. The camera-body microcomputer 114 is thus arranged to be capable of setting filter characteristics most apposite to the focusing state and the object conditions detected by the AF block disposed on the side of the lens unit.

Figure 5:
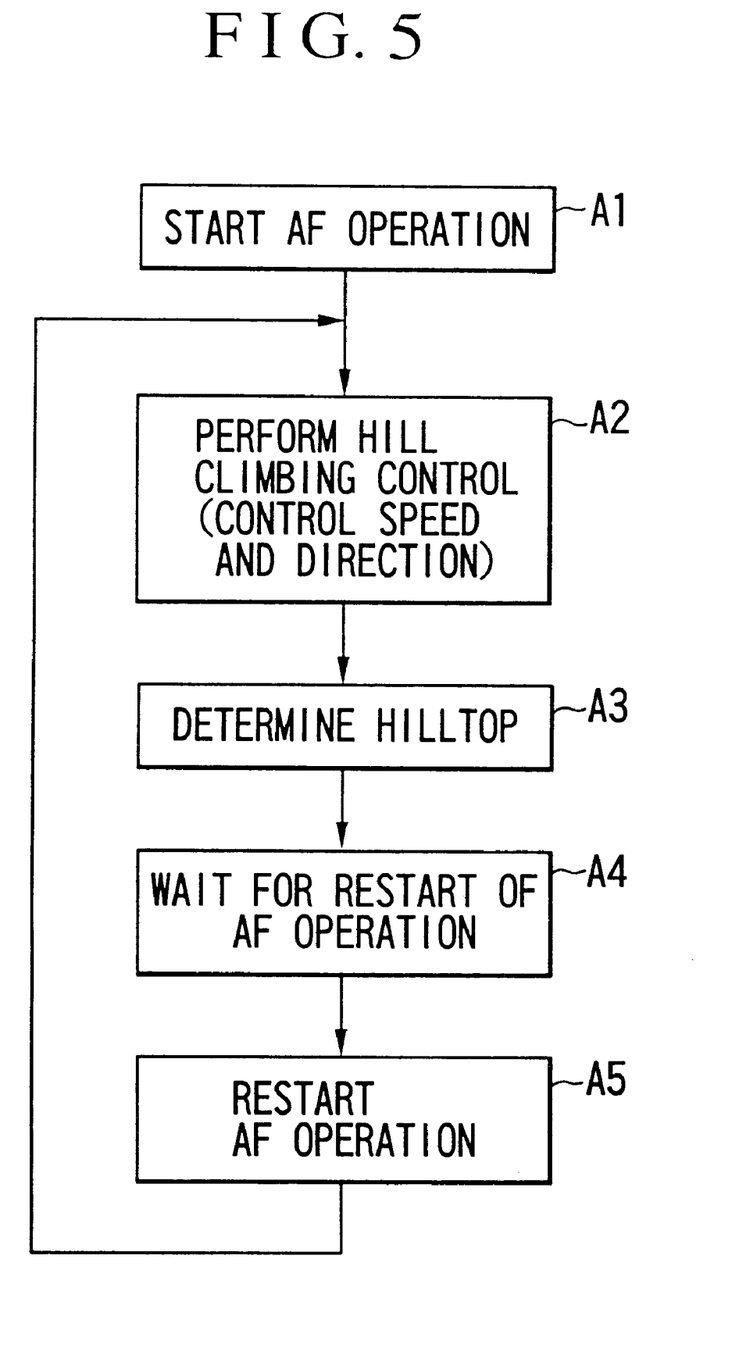
FIG. 5 is a flow chart showing an automatic focusing operation in the embodiment of the invention.

The algorithm of an automatic focus adjusting operation to be executed by the lens microcomputer 116 within the lens unit 127 is next described with reference to FIG. 5, which is a flow chart showing the flow of the operation. The focus adjusting operation starts at a step A1. At a step A2, a process of hill climbing control is executed by carrying out speed control on the basis of the peak levels of TE and FE. Direction control is performed by mainly using the TE line peak integral evaluation value in the neighborhood of a hill top and the FE line peak integral evaluation value in the skirt of the hill.

Next, at a step A3, a hilltop is determined on the basis of the absolute values of the TE and FE peak evaluation values and the varying amount of the TE line peak integral evaluation value. At a step A4, the focus adjusting operation is brought to a stop at a point of highest level, and the flow waits for a restart of the focus adjusting operation. At a step A5, the focus adjusting operation restarts when the levels of the TE and FE peak evaluation values are found to have lowered.

In the loop of the automatic focus adjusting operation, the state of the object is determined by using the Y peak evaluation value. Then, according to the result of decision, the filter characteristic of the TE-LPF 214 which has a high cutoff frequency and that of the FE-LPF 215 which has a low cutoff frequency are changed to obtain an optimum AF evaluation value which is most apposite to the object. The focus is adjusted according to the evaluation value thus obtained.

The focus signal obtained in the above manner is sent to the lens unit 127 to have the automatic focus adjusting control performed by the lens unit accordingly. The embodiment is thus arranged to be capable of deciding a response characteristic most apposite to each individual lens, so that the lens can be stably focused on any main object, under any shooting conditions, whatever lens may be mounted as an interchangeable lens.

In other words, information on a specific frequency decided by the automatic focus adjusting means for extraction by each of the filters is delivered to the camera body and the extracting frequency of the filter is arranged to be changed to the specific frequency. By virtue of this arrangement, an AF evaluation value most apposite to the object and shooting conditions can be obtained by varying the characteristic of the AF signal processing circuit disposed within the camera body, despite of the fact that the automatic focus adjusting means is disposed on the side of the lens unit. Therefore, it is possible to attain an image pickup apparatus capable of focusing on any main object, under any shooting conditions.

As described above, an in-focus state can be always stably attained for a main object irrespective of conditions and the state of the object.

Further, the arrangement for having an AF control circuit provided on the side of the lens unit enhances the adaptability of the camera to lens units of varied kinds. Further, the arrangement enables the AF control circuit disposed on the side of the lens unit to select and vary the characteristic of the extraction means disposed on the side of the camera body and the focus signal coming from the camera body. The embodiment is, therefore, capable of having always optimum AF characteristics whatever lens units may be mounted on the camera body.

What is claimed is:

1. An image pickup apparatus comprising:
   image pickup means;
   filter means for extracting, from an image signal outputted from said image pickup means, a high-frequency component which varies according to a state of focusing as a focus evaluating value;
   luminance detecting means for detecting a luminance level different from the high-frequency component in the image signal; and
   control means for varying a frequency passband of said filter means according to the luminance level detected by said luminance detecting means.

2. An image pickup apparatus according to claim 1, wherein said control means is arranged to vary a high cut-off frequency of said filter means.

3. An image pickup apparatus according to claim 2, wherein said control means is arranged to shift the high cut-off frequency of said filter means to a higher frequency when the luminance level is found to be high indicating a high luminance object.

4. An image pickup apparatus according to claim 3, wherein said filter means has a low-pass filtering characteristic.

5. An image pickup apparatus according to claim 1, wherein said filter means is composed of a plurality of filters, which have different frequency passbands and include a high-pass filter and a low-pass filter.

6. An interchangeable lens type camera comprising:

image pickup means;

filter means for extracting, from an image signal outputted from said image pickup means, a high-frequency component which varies according to a state of focusing;

luminance detecting means for detecting information on a luminance level in the video signal; and control means for transmitting an output of said filter means and an output of said luminance detecting means to a lens unit, and for varying a characteristic of said filter means according to predetermined information supplied from said lens unit.

7. An interchangeable lens type camera according to claim 6, wherein said control means is arranged to shift the high cut-off frequency of said filter means to a higher frequency when the luminance level is found to be high indicating a high luminance object.

8. An interchangeable lens type camera according to claim 7, wherein said filter means is a low-pass filter.

9. A lens unit detachably mountable on a camera body, comprising:

focus detecting means for detecting a state of focusing by receiving, from said camera body, information on a high-frequency component extracted from a video signal by filter means disposed at said camera body; and filter control means for transmitting, to said camera body, a filter control signal for varying a characteristic of said filter means of said camera body, on the basis of information on a luminance level received from said camera body.

10. A lens unit according to claim 9, wherein said filter control means is arranged to shift the high cut-off frequency of said filter means to a higher frequency when the luminance level is found to be high indicating a high luminance object.

11. A lens unit according to claim 10, wherein said filter means is a low-pass filter.

12. A focus detecting method, comprising:

extracting step of extracting by filter means, from an image signal outputted from image pickup means, a high-frequency component which varies according to a state of focusing as a focus evaluating value;

luminance detecting step of detecting a luminance level different from the high-frequency component in the image signal; and control step of varying a frequency passband of said filter means according to the luminance level detected in said luminance detecting step.

13. A method according to claim 12, wherein said control step is arranged to vary a high cut-off frequency of said filter means.

14. A method according to claim 13, wherein said control step is arranged to shift the high cut-off frequency of said filter means to a higher frequency when the luminance level is found to be high indicating a high luminance object.

15. A method according to claim 14, wherein said filter means is a low-pass filter.

16. A method according to claim 12, wherein said filter means is composed of a plurality of filters, which have different frequency passbands and include a high-pass filter and a low-pass filter.

* * * * *